US007007779B2

(12) United States Patent
Johansson et al.

(10) Patent No.: US 7,007,779 B2
(45) Date of Patent: Mar. 7, 2006

(54) ELECTROMAGNETIC BRAKE ASSEMBLY AND POWER SUPPLY

(75) Inventors: Conny Johansson, Hässelby (SE); Lars Nygren, Stockholm (SE); Bruno Slettenmark, Järfälla (SE)

(73) Assignee: Siemens Aktiengesellschaft, Munich (DE)

(*) Notice: Subject to any disclaimer, the term of this patent is extended or adjusted under 35 U.S.C. 154(b) by 6 days.

(21) Appl. No.: 10/659,859

(22) Filed: Sep. 11, 2003

(65) Prior Publication Data

US 2004/0074715 A1 Apr. 22, 2004

(30) Foreign Application Priority Data

Sep. 11, 2002 (SE) .................................... 0202689

(51) Int. Cl.
*B60L 7/00* (2006.01)

(52) U.S. Cl. ....................... 188/161; 188/158; 188/171

(58) Field of Classification Search ................ 188/161, 188/72.1, 162–165, 156–158, 171, 72.3; 303/20, 155; 361/160, 196, 170, 146, 190, 361/139, 143, 149; 310/93; 335/306; 336/136; 318/367, 372; 363/106–110; 323/267; 307/10.1, 307/9.1, 39; 187/296, 289; 378/197, 193, 378/196

See application file for complete search history.

(56) References Cited

U.S. PATENT DOCUMENTS 3,797,028 A * 3/1974 Miyakawa et al. ......... 396/246
4,609,080 A 9/1986 Sekella
4,759,048 A * 7/1988 Ohlson ........................ 378/197
4,844,370 A * 7/1989 Sakaguchi et al. ....... 242/548.4
4,910,422 A 3/1990 Brinkmann et al.
5,148,467 A * 9/1992 Sato et al. .................. 378/197
5,177,334 A * 1/1993 Magara et al. ........... 219/69.12
5,805,405 A * 9/1998 Benkaroun et al. ......... 361/194
5,988,327 A * 11/1999 Snyder ....................... 188/171

FOREIGN PATENT DOCUMENTS

| | | |
|---|---|---|
| DE | 10340213 A * | 3/2004 |
| FR | 2452452 | 3/1979 |
| JP | 450070 | 2/1992 |
| JP | 10355581 | 12/1998 |
| JP | 2000365367 | 11/2000 |

* cited by examiner

*Primary Examiner*—Melanie Torres
(74) *Attorney, Agent, or Firm*—Schiff Hardin LLP

(57) ABSTRACT

An electromagnetic brake assembly has a brake shoe) movable between a first position at which it is located in a braking engagement with a movable surface and a second position at which it is located out of braking engagement with the movable surface. An electromagnet is energizable to bias the shoe to one or other of the first and the second positions and a power supply is provided having a direct current source for supplying a direct current flow to energize the electromagnet. The power supply further has an alternating current source that provides an alternating current flow through the electromagnet with a successively decreasing amplitude characteristic, after interruption of the direct current flow.

9 Claims, 2 Drawing Sheets

ELECTROMAGNETIC BRAKE ASSEMBLY AND POWER SUPPLY

BACKGROUND OF THE INVENTION

1. Field of the Invention

The present invention relates to an electromagnetic brake assembly of the type in which an electromagnetic coil is energizable to bias a braking mechanism into or out of a releasable engagement with a movable surface in order to prevent relative movement between the braking mechanism and the surface, and to a power supply for energizing the electromagnet with a direct current.

2. Description of the Prior Art

Electromagnetic brake assemblies are known wherein a braking mechanism, such as a friction plate, is mounted for movement between a first position at which it is located in braking engagement with a movable surface and a second position at which it is located out of braking engagement with the movable surface, and having an electromagnet, energizable by a direct current source to bias the braking mechanism to one or other of the first and the second positions. One such brake assembly is described in U.S. Pat. No. 5,148,467 where it is described as being employed to arrest the rotational movement of an X-ray equipment holder in order to lock it at a desired arbitrary position. The disclosed electromagnetic brake assembly has an electromagnet and co-operating braking mechanism. When the electromagnet is energized to generate a magnetic force the braking mechanism is caused by that force to move to the first position where it presses against a rotatable disk of the holder. When the electromagnet is de-energized, a return spring returns the braking mechanism to the second position allowing rotation of the rotatable disk. A further magnetic brake assembly is described in U.S. Pat. No. 4,759,048 where again it is employed to arrest rotational movement of an X-ray equipment holder. Here an electromagnet is energizable to attract a braking mechanism to cause it to move to the second position in which a rotatable disk becomes unlocked. When the electromagnet is de-energized the braking mechanism is urged under the influence of a return spring to the first position where it engages the disk to lock its rotational movement. In both configurations of the electromagnetic brake assemblies described above the return spring must be made strong enough to counter the often-substantial residual magnetism that remains with the electromagnet after its de-energization. Unfortunately, this results in the need for a relatively more powerful electromagnet to generate a magnetic force sufficient to additionally counter the spring force before the braking mechanism can be caused to move.

SUMMARY OF THE INVENTION

It is an object of the present invention to provide for an electromagnetic brake assembly of the type described above in which the effect of residual magnetism is alleviated.

The above object is achieved in accordance with the principles of the present invention in an electromagnetic brake assembly having a braking mechanism movable between a first physician, at which the braking mechanism is located in braking engagement with a movable surface, and a second position, at which the braking mechanism is located out of braking engagement with the movable surface, an electromagnet that is energizable to bias the braking mechanism to one or the other of the first and second positions, and a power supply having a direct current source which supplies a direct current flow to energize the electromagnet, and which also supplies an alternating current flow through the electromagnet, upon interruption or removal of the direct current, the alternating current flow having a successively decreasing amplitude characteristic.

By configuring a power supply to provide for, upon removal of the direct current, an alternating current flow through the electromagnet having a successively decreasing amplitude characteristic, any residual magnetism within the electromagnet is reduced successively with the decreasing amplitude.

The direct current power supply may additionally include a separate alternating current source that generates the alternating current having the desired characteristic and a switching arrangement operable to selectively connect the electromagnet to one of the direct current source or the alternating current source at a time.

As an alternative to the alternating current source the power supply may simply include a capacitor connectable in parallel across the direct current source, having a capacitance selected to provide the alternating current having the desired characteristic.

The present invention also is directed to a power supply for an electromagnet that supplies a direct current to the electromagnet to energize the electromagnet and that supplies an alternating current having a successively decreasing amplitude characteristic that flows through the connected electromagnet after the energizing direct current flow is interrupted.

DESCRIPTION OF THE PREFERRED EMBODIMENTS

Figure 1:
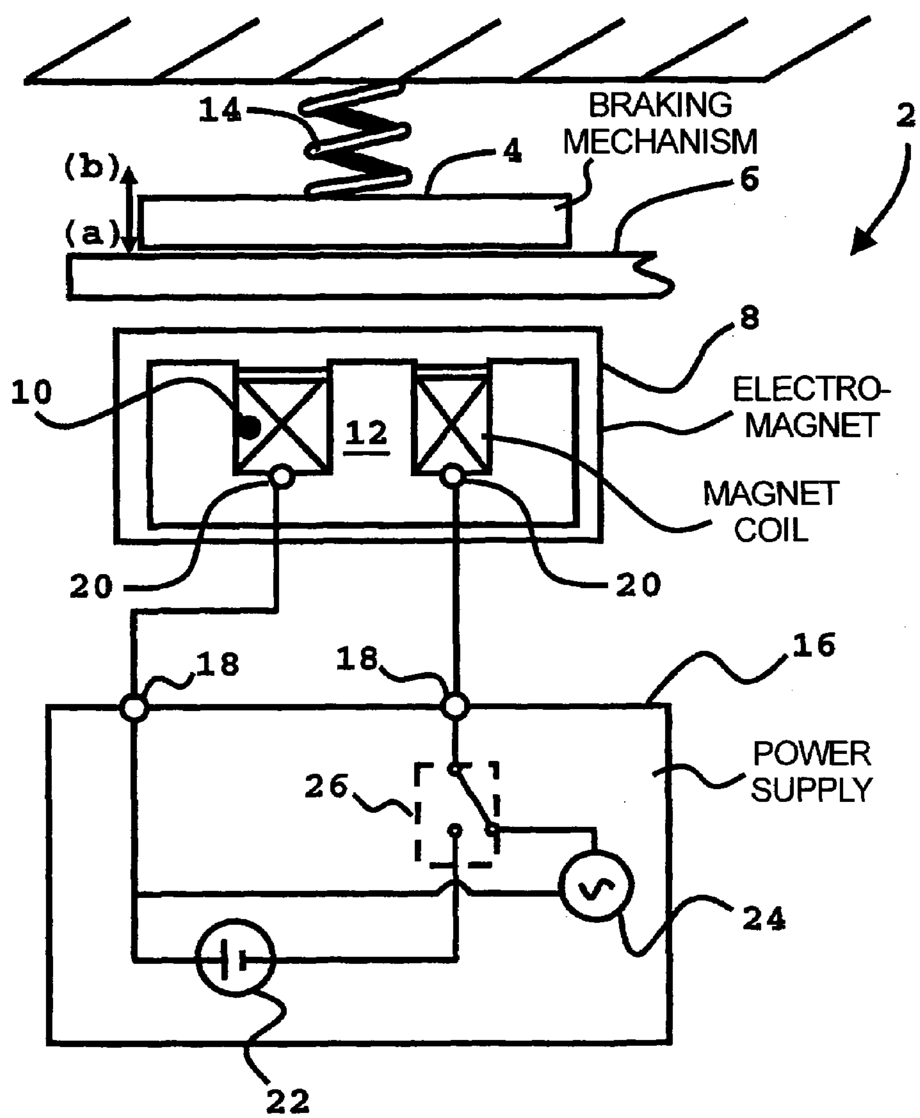
FIG. 1 shows an electromagnetic brake assembly according to the present invention.

In the embodiment of the electromagnetic brake assembly 2 illustrated in FIG. 1, a braking mechanism has a brake shoe 4 that is, at least in part, formed of a ferromagnetic material. The brake shoe 4 is mounted for reversible movement in the directions shown by the arrow between a first position, indicated generally by (a), at which the shoe 4 is located in frictional engagement with a movable surface 6 to lock its further movement and a second position, indicated generally by (b), at which it is located out of engagement with the surface 6. An electromagnet 8, having a magnet coil 10 and ferromagnetic core 12 is arranged relative to the brake shoe 4 so that, upon supply of a direct current to the coil 10 a magnetic force is generated which biases the shoe 4 to the first position (a). A return spring 14 is provided as part of the braking mechanism, as is illustrated in the present embodiment, and urges the brake shoe 4 to return to the second position (b) upon removal (interruption) of the direct current.

It will be appreciated by those skilled in the art that other types of known braking mechanisms may be employed in the electromagnetic brake assembly 2 of the present invention. For example, the electromagnet 8, or elements thereof, may be additionally or alternatively mounted for movement to engage with and disengage from the surface 6 as the coil 10 is either energized or de-energized. Moreover the electromagnet 8, for example, may be movable to the first position to clamp the surface 6 against an opposing surface of the braking mechanism, such as may, for example, be formed, for example, by the movable brake shoe 4 or by a fixed jaw, replacing the brake shoe 4. The electromagnetic brake assembly 2 further comprises a power supply 16 having outputs 18 connectable to inputs 20 of the magnet coil 10. The power supply 16 comprises, a direct current source 22 that can connect to the outputs 18 to energize the magnet coil 10 of the electromagnet 8 and an alternating current source 24 that may also be connected to the outputs 18 in order to provide an alternating current flow through the magnet coil 10 having positive and negative going portions with successively decreasing amplitudes. The construction of such an alternating current source 24 is readily achievable by a person skilled in the art using conventional electrical components and provided with a knowledge of the desired current waveform characteristics of the output from the alternating current source 24. Such characteristics are further discussed below with reference to the power supply of FIG. 2 and may be realized by, for example, a square wave, a saw-tooth (triangular) wave or sinusoidal wave waveform.

The electromagnetic brake assembly 2 further has a power supply 16 with outputs 18 connectable to inputs 20 of the magnet coil 10. The power supply 16 includes a direct current source 22 that can be connected to the outputs 18 to energize the magnet coil 10 of the electromagnet 8, and an alternating current source 24 that may also be connected to the outputs 18 in order to provide an alternating current flow through the magnet coil 10, having positive and negative proceeding portions with successively decreasing amplitudes. The construction of such an alternating current source 24 is readily achievable by a person skilled in the art using conventional electrical components and provided with a knowledge of the desired current waveform characteristics of the output from the alternating current source 24. Such characteristics are further discussed below with reference to the power supply of FIG. 2 and may be realized by, for example, a square wave, a saw-tooth (triangular) wave or sinusoidal wave waveform.

A switching arrangement 26 is also provided as part of the power supply 16 and is here configured with two conducting states. In the first conducting state the switching arrangement 26 provides a conductive path connecting the direct current source 22 to the outputs 18 to the exclusion of the alternating current source 24. In the second conductive state (illustrated) the switching arrangement 26 provides a conductive path connecting the alternating current source 24 to the outputs 18 to the exclusion of the direct current source 22. Switching from the first to the second conductive state may be made automatic, for example in response to a user indicating to the power supply 16 a desire to unlock the movement of the surface 6, or may be done for a predetermined time to permit a sufficient number of alternating current cycles to flow through the magnet coil 10 to effectively remove any residual magnetism. It will be appreciated that other switching arrangements may be substituted for the one 26 described above provided that they operate to switch the current source connected to the outputs 18 between the direct current source 22 and the alternating current source 24 in a mutually exclusive manner.

Thus, in the present example, when the switching arrangement 26 is switched from the first to the second conductive state, the direct current flow from the direct current source 22 to the magnet coil 10 is interrupted. However, because of hysteresis effects in the ferromagnetic material that forms the core 12 of the electromagnet 8, a residual magnetism exists which will tend to maintain, in the present example, the brake shoe 4 in frictional engagement with the movable surface 6. It is the magnetic force generated by this residual magnetism that in prior art electromagnetic braking assemblies is countered by the spring force of the return spring 14.

In the embodiment of the present invention illustrated in FIG. 1 the coupling of the alternating current source 24 to the magnet coil 10 when the switching arrangement is in the second conductive state provides an alternating current flow through the coil 10 which, because of its chosen waveform characteristics, will tend to reduce the residual magnetism with each reduction in amplitude of the positive and negative proceeding cycles.

Figure 2:
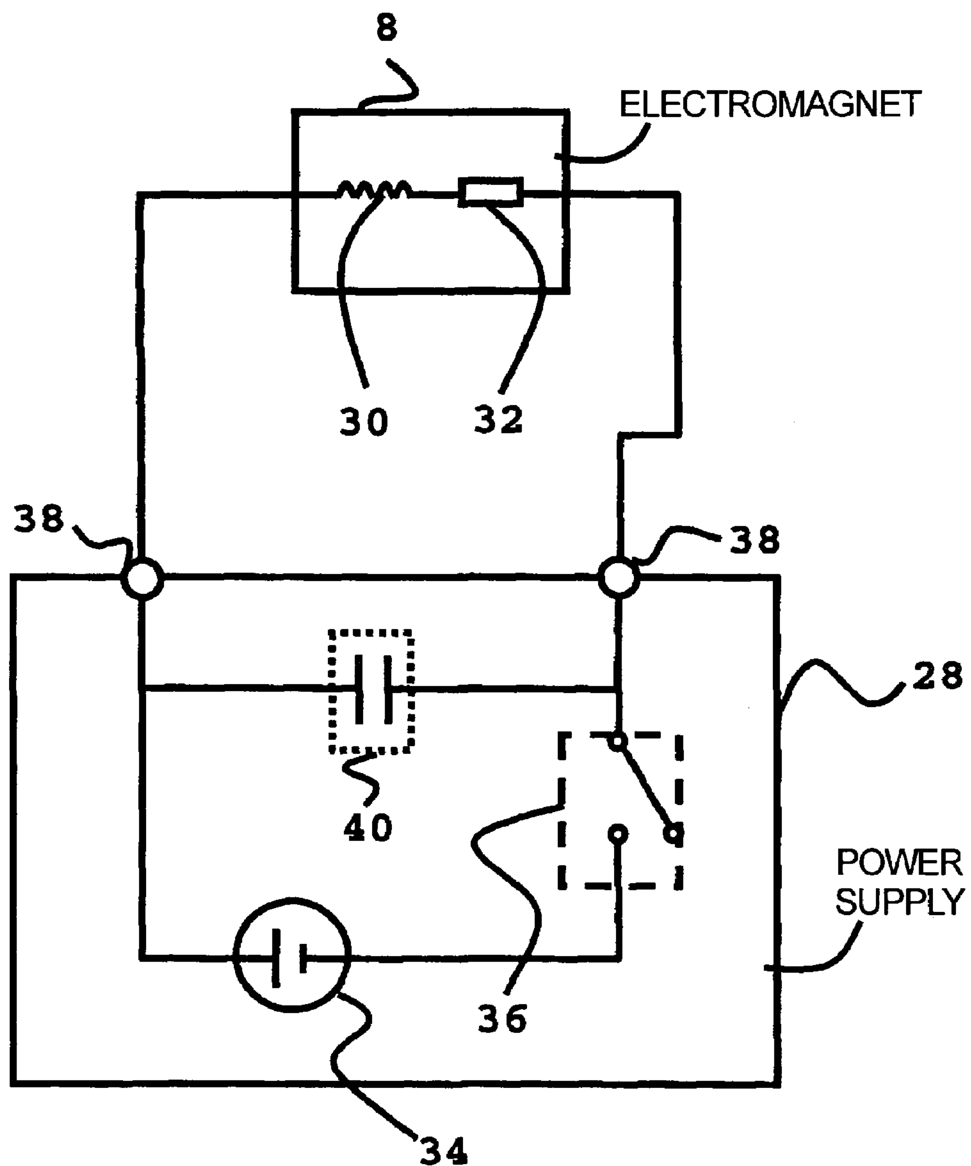
FIG. 2 shows a power supply as an alternative to that show in the assembly of FIG. 1.

An alternative power supply 28 to that of the embodiment of FIG. 1 is illustrated schematically in FIG. 2. It will be appreciated by those skilled in the art that the electromagnet 8 may be represented electrically by an inductance 30 of magnitude L (measured when the electromagnet 8 is fully energized) and a series resistance 32 of magnitude R, as is shown in FIG. 2. The resistance R will be formed by a series combination of a winding resistance (Rw) and an equivalent resistance (RH) due to hysteresis.

The power supply 28 has a direct current source 34, capable of developing a voltage V, and a switching arrangement 36 electrically connected in series between the direct current source 34 and outputs 38 of the power supply 28. The switching arrangement 36 is configured to be reversibly switchable between a conductive state, in which the direct current source 34 is coupled to the outputs 38, and a non-conductive state (illustrated), in which the current flow from the direct current source 34 to the electromagnet 8 is interrupted. It will be appreciated that other switching arrangements may be substituted for the one described provided that they operate to interrupt the supply of a direct current from the power supply 28 to the electromagnet 8.

A capacitive element 40, which may be formed by one or more capacitors and may be made to provide a selectably variable capacitance, presents a capacitance of magnitude C and is included as part of the power supply 28. This element 40 is electrically connected in parallel with the direct current source 34 across the outputs 38 so as to provide a conductive path for current flowing through the electromagnet 8 after activation of the switching arrangement 36 to interrupt the supply of the direct current.

Thus when the switching arrangement 36 is in its conductive state, current will be supplied from the direct current source 34 to the electromagnet 8 and the capacitive element 40 will be effectively bypassed. When the switching arrangement 36 is switched from this conductive state then the current flow from the direct current source 34 through the electromagnet 8 will be interrupted. Because of the magnetic field energy stored in the inductance 30, the current will be forced to flow through the capacitive element 40, charging it until its stored energy equals the initial inductive energy (minus resistive losses in the resistance 32). At this point the current changes direction and an alternating current with decreasing amplitude characteristics is created to flow through the magnet coil 10 of the electromagnet 8. The waveform characteristics of this decaying alternating current can be predicted using the well-known damped LCR oscillation circuit theory, as expressed by equation (2) below. As described below, by matching the magnitude C of the element 40 with respect to the magnitudes L, R of the electromagnet inductance 30 and resistance 32 this alternating current may be made to exhibit an appropriately decaying amplitude characteristic so as to effect a rapid reduction in the residual magnetism of the electromagnet 8.

When the switching arrangement 36 is in its conductive state a direct current of magnitude 1, as determined from equation (1), will flow through the windings of the magnet coil 10 of the electromagnet 8, with:

$$1 = \frac{V}{R} \tag{1}$$

When the switching arrangement 36 is switched to its non-conductive state a current, I(t), will continue to flow through the capacitive element 40 and the coil 10 with a time dependent decaying oscillation described by:

$$I(t)=I(0)\cdot\sqrt{1+\tfrac{1}{2}\tau\omega}\cdot e^{-t/2r}\cdot\sin(\omega t+a\ \tan(2\tau\omega)) \tag{2}$$

wherein t is time;

I(0) is the magnitude of the current, I, at time t=0 (ie at the time when the direct current is removed);

$$\omega=2\pi f \tag{3}$$

(f being the frequency of oscillation of the alternating current); and $$\tau = \frac{L}{R} \tag{4}$$

$\tau$ being the so-called "time constant" of the LCR circuit presented by the power supply 28 and the electromagnet 8.

Here $\omega$ is defined by:

$$\omega = \sqrt{\frac{1}{LC} - \frac{1}{4\tau^2}} \tag{5}$$

As long as the expression under the square root of equation (5) is positive, there will be an oscillating decay of the current. Thus using equation (5) and, for example, knowing the values for R, and L then a suitable value of C may be determined to ensure that a value for $\omega$ (and hence from equation (3) the frequency of the alternating current) is obtained that lies within a suitable interval. It will be appreciated that equation (5) may also be used to, for example, design an electromagnetic brake assembly with properly matched magnitudes of L, R and C employing well known construction techniques.

The value for $\omega$ should be low enough so that the induced eddy currents in the ferromagnetic core ("skin" effect) will not prevent the demagnetizing field from penetrating into the bulk of the material.

It will be appreciated that a magnetic field transient will induce eddy currents in an electrically conducting material that tend to shield the interior of the material from the field. The eddy currents will decay and the field penetrates the bulk after some time delay.

In the case of an alternating current field one can derive and define a "penetration depth" d in the material where the amplitude of the field has decreased to 1/e of its amplitude at the surface of the material, according to the equation:

$$d = \sqrt{\frac{\rho}{2\pi f \mu\mu_0}} \tag{6}$$

wherein $\rho$ is electrical resistivity; $\mu$ is the permeability of the material and $\mu_0$ is the permeability of free space Thus the frequency of the alternating current may be expressed as:

$$f = \frac{\rho}{2\pi d^2 \mu\mu_0} \tag{7}$$

Thus, for a given thickness $d_o$ of a conducting structure it is required that $$f \leq \frac{\rho}{2\pi d_0^2 \mu\mu_0} \tag{8}$$

in order for the field to penetrate the material.

Using equation (3) then:

$$\omega \leq \frac{\rho}{d_0^2 \mu\mu_0} \tag{9}$$

However, if $\omega$ is too low, there will be too few oscillations in the decaying process and the demagnetization will not be complete.

By tailoring the construction of the electromagnet 8 and/or the power supply 28 then values L, C, R of respectively the inductance 30, the resistance 32 and the capacitive element 40 may be selected to obtain a value of $\omega$ from the equation (5) above that fulfills the condition of equation (9) above.

It should be remembered that L is dependent on the number of turns in the magnet coil 10 and R is dependent on both of the number of turns and the diameter of the copper wire of the coil 10. Thus L and R can be varied and the value C of the capacitive element 40 chosen accordingly.

Using equation (5) for typical electromagnet constructions it can be readily demonstrated that a value of C of between typically 10–100 $\mu$F will be suitable. This may easily be obtained using known, for example polyester based, capacitors.

The capacitive element 40 may be designed with a variable capacitance C so that the same power supply 28 may be employed with electromagnets 8 of differing characteristics and constructions (values of L and R).

In some circumstances, depending on, for example, the design of the electromagnet 8, the size of the core 12, and properties of the ferromagnetic material making up the core 12 the condition in equation (9) will require a very low value of $\omega$. This may lead to too few oscillations taking place before the current has decayed, as calculated from equation (2) above with a consequence that the demagnetization will not be complete.

One way of circumventing this is to use a conventional laminated construction of the core 12 in which the laminae are electrically insulated from each other. This measure will decrease $d_o$ and thus a higher value of $\omega$ is allowed (see equation (9)).

When the power supply 16 includes an alternating current source 24, such as illustrated in FIG. 1, one can construct the source 24 to provide an adjustable frequency, alternating current output, the frequency of which may then be adjusted to fulfill the condition of equation (9) for any design of electromagnet 8, regardless of the materials and dimensions (laminated design is never required).

Although modifications and changes may be suggested by those skilled in the art, it is the intention of the inventors to embody within the patent warranted hereon all changes and modifications as reasonably and properly come within the scope of their contribution to the art.

We claim:

1. An electromagnetic brake assembly comprising:

a braking mechanism adapted to brake a movable surface, said braking mechanism being movable between a first position at which said braking mechanism is located so as to be adapted for braking engagement with the movable surface, and a second position, at which the braking mechanism is out of braking engagement with the movable surface;

an electromagnet that is energizable to bias said braking mechanism to one of said first and second positions; and a power supply having a direct current source for supplying an interruptible direct current flow to energize said electromagnet, and having an arrangement for supplying an alternating current flow through the electromagnet with a successively decreasing amplitude characteristic after interruption of said direct current flow.

2. An electromagnetic brake assembly as claimed in claim 1 wherein said arrangement in said power supply for supplying said alternating current flow is an alternating current source, and wherein said power supply comprises a switch connected between said direct current source and said alternating current source, and said electromagnet, said switch being operable to interrupt the direct current flow to the electromagnet and to connect said alternating current source to the electromagnet.

3. An electromagnetic brake assembly as claimed in claim 1 wherein said arrangement for supplying alternating current to said electromagnet comprises a capacitive element electrically connected to said direct current source in an electric current flow path between said direct current source and said electromagnet.

4. A power supply for an electromagnet, said power supply comprising:

a direct current source adapted for connection to an electromagnet for supplying an interruptible direct current flow to energize the electromagnet;

an alternating current source for supplying an alternating current flow through the electromagnet having a successively decreasing amplitude characteristic; and a switch, connected to said direct current source and to said alternating current source, and adapted for connection to the electromagnet, said switch being operable to interrupt said direct current flow and to produce an electrical current flow oath from said alternating current source to the electromagnet.

5. A power supply as claimed in claim 4 wherein said alternating current source supplies said alternating current flow with a selectable frequency.

6. A power supply as claimed in claim 4 wherein said arrangement for supplying said alternating current flow comprises a capacitive element connected in parallel with said direct current source in an electrical current flowpath from said direct current source to the electromagnet.

7. A power supply as claimed in claim 6 wherein said capacitive element has a selectable capacitance.

8. A power supply for an electromagnet, said power supply comprising:

a direct current source adapted for connection to an electromagnet for supplying an interruptible direct current flow to energize the electromagnet; and an arrangement adapted for connection to the electromagnet upon interruption of said direct current flow to supply an alternating current flow through the electromagnet having a successively decreasing amplitude characteristic, and having a capacitive element connected in parallel with said direct current source in an electrical current flowpath from said direct current source to the electromagnet.

9. A power supply as claimed in claim 8 wherein said capacitive element has a selectable capacitance.

* * * * *